United States Patent [19]

Sexton et al.

[11] Patent Number: 4,731,573

[45] Date of Patent: Mar. 15, 1988

[54] METHOD FOR CHARGING ELECTRICAL STORAGE BATTERIES

[75] Inventors: Daniel E. Sexton; Jimmie N. Short, both of Lexington, Ky.

[73] Assignee: Ralph J. Stolle Co., Cincinnati, Ohio

[21] Appl. No.: 865,780

[22] Filed: May 22, 1986

[51] Int. Cl.[4] .................................................. H02J 7/00
[52] U.S. Cl. ........................................ 320/14; 320/20; 320/53
[58] Field of Search ...................... 320/4, 9, 14, 20, 53

[56] References Cited

U.S. PATENT DOCUMENTS 3,816,806  6/1974  Mas ........................................ 320/20
4,385,269  5/1983  Aspinwall et al. ..................... 320/20

Primary Examiner—Patrick R. Salce
Assistant Examiner—Anita M. Ault
Attorney, Agent, or Firm—Edward M. Steutermann

[57] ABSTRACT

Apparatus and method for charging electrical storage batteries including an electrical source providing a forward flow of charging current of selected value and cyclical wave generator for cycling current flow to the battery, where flow of current to the battery, is periodically terminated and a flow path is provided to allow reverse current flow from the battery for a period of time less than 25% of the period during which forward current flow occured.

2 Claims, 5 Drawing Figures

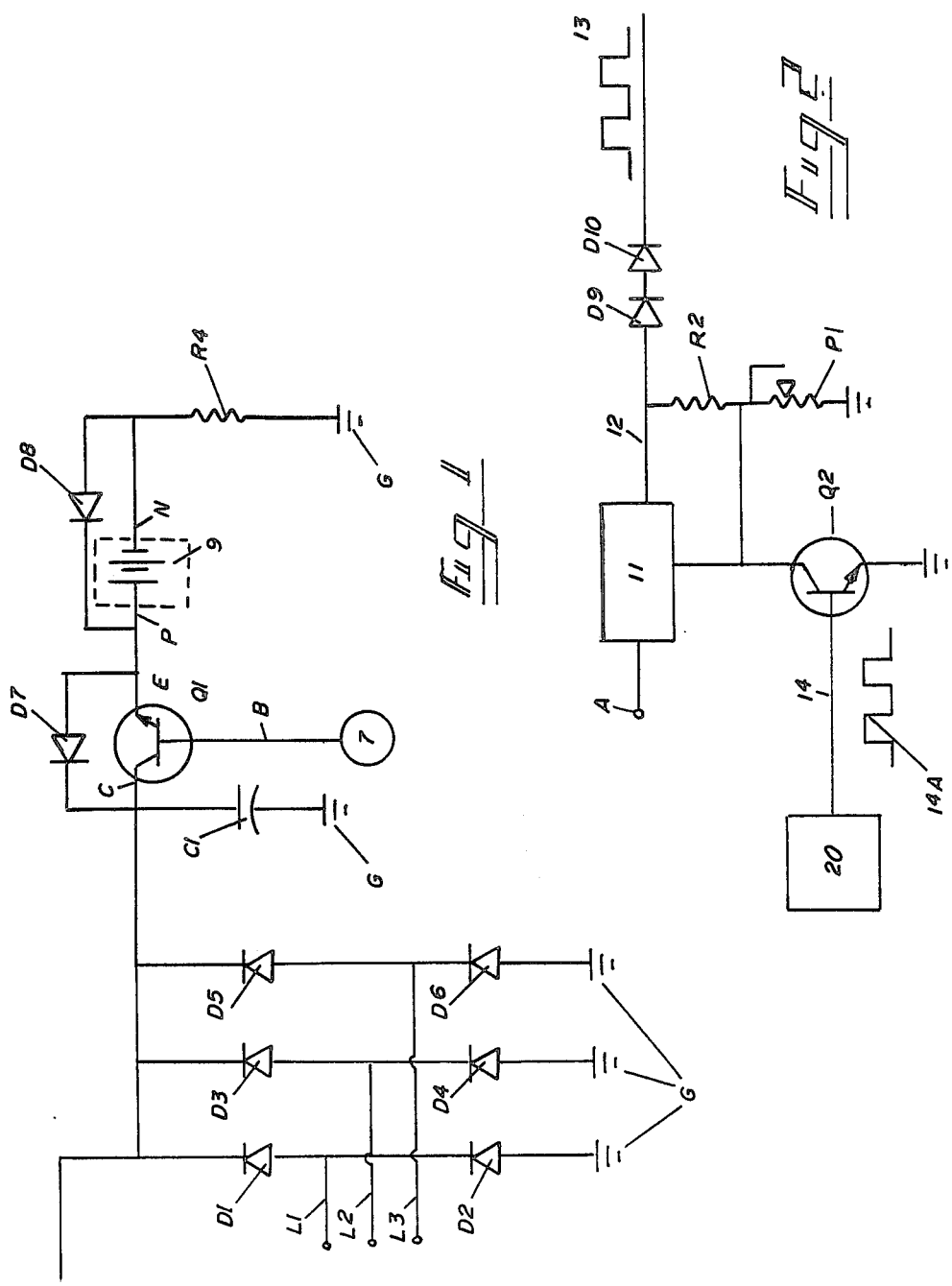

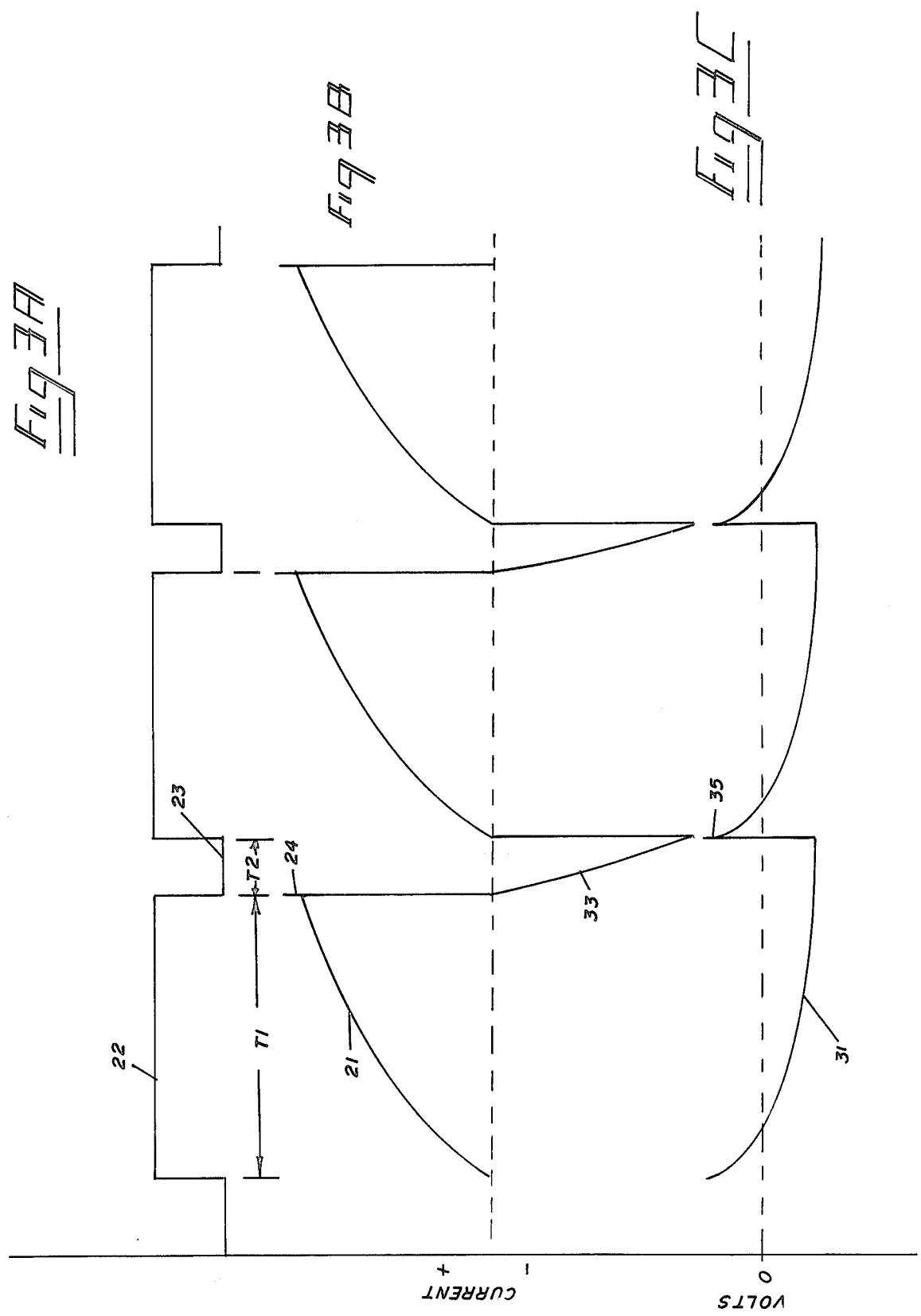

METHOD FOR CHARGING ELECTRICAL STORAGE BATTERIES

BACKGROUND OF THE INVENTION

The present invention relates to devices for supplying a characteristic current flow which is particularly useful to supply charging current to electrical storage batteries, for example, charging lead-acid storage batteries.

Battery chargers of various types are commonly used and, include dynamoelectric devices which generally include rotating machines functioning through electromagnetic phenomena associated with current carrying conductors passing through a magnetic field to provide a source of electricity for use in charging batteries as well as devices of the alternating current rectifier type. The dynamoelectric devices can be of the direct current type which generate polarized current which can be supplied directly to a battery or can provide an alternating current which is then rectified, as is known in the art, to provide a direct current fixed polarized source for battery charging.

Alternatively, charging devices are utilized using commercially available alternating current which is rectified and then supplied to the battery as direct current having fixed positive and negative polarity. Heretofore, it has been generally thought desirable to supply a generally stable, rectified, filtered voltage and current source for use in charging electric batteries and particularly for use in charging a lead-acid batteries. However U.S. Pat. No. 4,371,226 relates to a battery charging apparatus utilizing pulse width modulated constant current charging signals.

The means of conditioning and characterizing the charging current flow to the battery has been found to be important. One means for conditioning and characterizing the current flow is disclosed in copending patent application Ser. No. 639,090 which provides for improved operation performance by cyclical charging of a battery but does not provide for reverse current flow.

While the present invention is described in terms of charging lead-acid batteries it will be recognized that the methods and apparatus within the scope of the present invention are useful in charging other types of batteries and supplying current for other applications.

No prior art device is known to providing direct current electric charge to batteries and to supply a forward current flow to charge a battery where the current flow is periodically cycled and means are provided to allow reverse current flow of the battery charge current for a selected brief period of time in order to enhance characteristics of battery charging.

SUMMARY OF THE INVENTION

The present invention provides a new, useful, economical and efficient methods and devices for charging or recharging electrical storage batteries, or supplying current for other purposes where a forward current flow is provided for a period of time and then a reverse current flows through the battery charging circuit to withdraw charge from the battery where in accordance with the present invention, it has been unexpectedly found that the reverse current in the charging circuit and the electrical storage battery in the manner described hereinafter, greatly increases the charging efficiency of an electric storage battery. The method and apparatus in accordance with the present invention has been found particularly useful in charging lead-acid batteries.

The method and apparatus even more unexpectedly greatly reduces the time necessary for the charging cycle over that required by the use of other prior art devices such as dynamoelectric devices and/or rectifier devices none of which provides a reverse current flow even though they may periodically vary current rates.

Moreover, it has also been unexpectedly found that utilization of methods and devices within the scope of the present invention will improve the operating characteristics of a storage battery after it has been charged several times and even allow the reconditioning and reversal of some types of deterioration in batteries which have deteriorated to the point they could not be utilized when charged by prior art methods.

Further devices within the scope of the present invention can be utilized in connection with various electrical sources, for example dynamoelectric devices or rectifier devices which use alternating current to modify charging current flow to improve the efficiency of charging of the battery.

In devices in accordance with the present invention, it has been found that when the forward charge current to the battery is terminated, the current flow briefly increases and then drops rapidly to the zero point, than reverse current flow occurs through the circuit for a brief period of time. While neither the source of the effect realized by these current characteristics are fully understood it has been found that a charge device with those characteristics provides means to charge a battery at a rate greater than any known prior art procedure and greatly reduce the heat generated in the charging cycle. While not fully understood it is believed that the current flow characteristics exhibited by charging devices utilizing the methods and apparatus in accordance with the present invention result from capacitive-inductive effects in the circuits, the battery, and conductors to reduction in boundary layer resistance at the plates of the battery.

Briefly the present invention provides an apparatus and method for charging electrical storage batteries including an electrical source providing a forward flow of charging current of selected value and cyclical wave generator for cycling current flow to the battery, where flow of current to the battery, is periodically terminated and a flow path is provided to allow reverse current flow from the battery for a period of time less than 25% of the period during which forward current flow occured.

BRIEF DESCRIPTION OF THE DRAWINGS

Referring now to the figures which illustrate an arrangement within the scope of the present invention:

FIG. 1 is a schematic diagram of one arrangement within the scope of the present invention;

FIG. 2 is a schematic diagram of a timing circuit useful in the arrangement shown in FIG. 1; and FIGS. 3A-3C are graphic illustrations of voltage and current flow in a typical cycle within the scope of the present invention.

DETAILED DESCRIPTION OF THE DRAWINGS

Referring first to FIG. 1 which is an illustration of an example of an overall charging circuit within the scope of the present invention a source of electrical power, for example direct current, as illustrated 3 phase alternating current from lines L1–L3 is provided through rectifier including diodes D1–D6 and capacitor C1 to provide a positive output leg 1. The power supply from leg 1 can, as shown, be filtered or it could be unfiltered however, in many instances it is preferable that the supply be at least partially filtered.

In FIG. 1 positive leg 1 is provided and the anodes of diodes D2, D4, D6, and capacitor C1 are connected to ground.

In the example of FIG. 1 the positive output from leg 1 is supplied to collector C of a transistor Q1, for example a power transistor having a base B and an emitter E. Emitter E is connected to the positive terminal P of a battery 9 which is to be charged. The negative terminal N is connected through a shunt resistor R4 to ground. It has been found that in accordance with the present invention, and the invention described in previously noted patent application, that in charging electric storage batteries and particularly lead-acid storage batteries it is helpful to pulse the current to the battery. Accordingly, a timing arrangement 7 is provided to remove base current from the base B of the transistor Q1 in a cyclical pattern so that forward current flow is pulsed to battery 9. In accordance with another feature of the present invention, a feature which has been unexpected, it is found to be helpful to allow a reverse current flow during the interim between each charging cycle, when transistor Q1 is turned off. Accordingly, a diode D7 is provided around transistor Q1 as shown with its cathode connected to the positive output leg 1.

Diode D7 allows a reverse current flow as described with reference to FIG. 3 where current flows from the battery 9 for a brief moment. It has been found that the brief reverse current can be as high as 50% or more of forward flow.

Turning for the moment to FIG. 2 which is an illustration of an example of a timing current generator which can be utilized to set the cyclical pattern for on/off operation of transistor Q1, a voltage regulator 11, for example, a Part No. LM 338 is provided and is supplied from a power source A. Timing pulses are provided, for example from a timer 20 e.g. a part number 7555 timer, to the base of a transistor Q2 knowing its emitter connected to ground and its collector connected to the adjust pin of voltage regulator 11. A potentiometer P1 is connected to the adjust input of the regulator 11 and to ground so the setting of the potentiometer P1 determines the amplitude of the signal output 12 as shown by the curve 13 of FIG. 2 and curve 22 of FIG. 3A.

The output signal 12 is passed through a pair of dropping diodes D9 and D10 to the base B of transistor Q1. Accordingly the on/off operation of transistor Q1 can be modified by simply modifying the pulse train 14 applied to the base of Q2.

In accordance with another feature of the present invention a diode D8 is provided from the negative side to the positive side of the battery. The purpose of D8 is to dampen the negative voltage across the battery believed to be produced by the "inductive effect" of the battery plates when transistor Q1 is turned off. It is believed that as the current flow starts through the battery plates the associated magnetic field directly related to the mass of the battery initally expands at a decreasing rate providing less and less opposition to forward current flow causing a decreasing forward voltage drop across the battery plates.

Referring now to FIGS. 3A–3C which illustrate examples of characteristics of operation of the device of the type shown in FIGS. 1 and 2, a positive current 21 flows during the period T1 which is the time when transistor Q1 is in the conductive state with signal 22 on the base B. It will be noted that the current rise and characteristically diminishes with time. At the end of time T1 the transistor has been turned off by signal 23 as shown in FIG. 3A. It has been found that in some instances current flow climbs additionally as shown by line 24 when the transistor is turned off because of the inductance of the circuit.

FIG. 3C shows indicated battery voltage 31 and power supply voltage 32 during the period of current flow.

In accordance with another feature of the present invention, which is provided by the diode D7 allowing reverse current flow, it has been found as shown in FIG. 3B that after the period T1, and during the period T2 the current drops rapidly as shown by curve 33 and in fact a negative current flow is established and then recovers. The negative current may be in excess of 500% of forward flow for a very brief period of time. The current flow then returns to approximately 0 amps. and allows forward flow of current. While the mechanism by which the regenerative current flow occurs is not fully understood it is clear that the negative current flow provides unexpected and significant beneficial effects on the charging of a battery.

It is believed that the negative current flow affects the boundary layer phenomenon which is present in all battery charging applications and particularly is present in the charging of lead-acid batteries where gassing occurs at the surface of the plates. The beneficial effects provided by the present invention includes an apparent modification of the battery system to allow enhanced acceptence of electrical current and further provides an extended overall battery life and extended battery charge life between charges so that the over all characteristics of the battery are improved. It has been found that in some instances even batteries which were thought to have deteriorated beyond use can be reconstituted after several chargings to permit the use of the batteries in full service.

In the forgoing it is obvious that the characteristics of devices within the scope of the present invention enhance the operation of batteries.

It will be also understood that the forgoing is but one example of an arrangement within the scope of the present invention and various other arrangements also within the scope of the present invention will occur to those skilled in the art upon reading the disclosure set forth hereinafter.

The invention claimed is:

1. Apparatus for charging electrical storage battery means including electrical current generating means to supply a forward flow of charging current of selected value; a cyclical wave generating means for cycling flow of said charging current to said battery; switch means to control said charging current flow and periodically terminate forward flow of said charging current flow at selected intervals; reverse charging current flow path to allow current flow from the battery in a direction opposite to the direction of charging current flow for a period of time less than 25% of the period during which forward flow of charging current occured and wherein said electrical storage battery includes at least first and second terminal means where said first terminal means is connected to a reference voltage potential and said second means is connected to said switch means output to receive said forward flow of charging current and undirectional current flow means connected between said first and second terminals to allow current flow from said first to said second terminal whereby said current flow from said first to said second terminals occurs during periods when said forward flow of charging current is terminated.

2. Apparatus for charging electrical storage battery means including electrical current generating means to supply a forward flow of charging current of selected value; a cyclical wave generator is provided generating means for cycling said charging current to said battery; switch means to control said charging current flow and periodically terminate forward flow of said charging current flow at selected intervals; reverse charging current flow path to allow current flow from the battery in a direction opposite to the direction of charging current flow for a period of time less than 25% of the period during which forward flow of charging current occured and wherein said electrical storage battery includes at least first and second terminal means where said first terminal means is connected to a reference voltage potential and said second means is connected to said switch means output to receive said forward flow of charging current and where undirectional current flow means are connected between said first and second terminals to allow current flow from said first to said second terminal whereby said current flow from said first to said second terminals occurs during periods when said forward flow of charging current is terminated wherein said reverse flow path includes undirectional current flow means to allow said reverse flow when said forward flow of charging current is terminated and prevent said reverse flow when said charging current is on.

* * * * *